(12) United States Patent
Barnes

(10) Patent No.: US 9,951,903 B2
(45) Date of Patent: Apr. 24, 2018

(54) DIGITAL DISPLAY MOUNTING AND LIFT BRACKET

(71) Applicant: Uni-Structures, Inc., Kennesaw, GA (US)

(72) Inventor: Michael S. Barnes, Marietta, GA (US)

( * ) Notice: Subject to any disclaimer, the term of this patent is extended or adjusted under 35 U.S.C. 154(b) by 20 days.

(21) Appl. No.: 15/213,698

(22) Filed: Jul. 19, 2016

(65) Prior Publication Data

US 2018/0023756 A1    Jan. 25, 2018

(51) Int. Cl.
| | | |
|---|---|---|
| E04G 3/00 | (2006.01) | |
| F16M 13/02 | (2006.01) | |
| F16M 11/10 | (2006.01) | |
| A47B 97/00 | (2006.01) | |

(52) U.S. Cl.
CPC ............. *F16M 13/02* (2013.01); *A47B 97/00* (2013.01); *F16M 11/10* (2013.01); *A47B 2097/005* (2013.01); *F16M 2200/041* (2013.01)

(58) Field of Classification Search
CPC ............. Y10T 16/5383; Y10T 16/5409; Y10T 16/5478; Y10T 403/32254–403/32271
USPC ....... 248/274.1, 276.1, 284.1, 291.1, 292.11, 248/323, 324, 325, 919, 921–923, 122.1, 248/123.11, 123.2, 124.1, 125.1, 162.1; 361/679.02, 679.05, 679.21; 108/108, 108/134, 135
See application file for complete search history.

(56) References Cited

U.S. PATENT DOCUMENTS

| | | | | |
|---|---|---|---|---|
| 4,369,948 A | * | 1/1983 | Krauss | A47B 77/10 108/32 |
| 4,998,484 A | * | 3/1991 | Groetzinger | A47B 5/04 108/115 |
| 5,108,063 A | * | 4/1992 | Koerber, Sr. | F16M 11/10 248/284.1 |
| 5,738,316 A | * | 4/1998 | Sweere | F16M 11/10 248/123.11 |
| 6,019,332 A | * | 2/2000 | Sweere | A47B 21/00 248/280.11 |
| 6,386,120 B1 | * | 5/2002 | Nelson | H05K 7/1489 108/134 |
| 7,225,933 B1 | * | 6/2007 | Pollock | B62H 3/12 211/118 |
| 7,677,515 B2 | * | 3/2010 | Oddsen, Jr. | F16M 11/2014 248/274.1 |
| 8,070,120 B2 | * | 12/2011 | Lange | F16M 11/2014 248/282.1 |
| 8,074,950 B2 | * | 12/2011 | Clary | F16M 11/041 248/276.1 |
| 8,382,052 B1 | * | 2/2013 | Mathieson | F16M 11/046 248/202.1 |
| 8,570,723 B2 | * | 10/2013 | Myerchin | F16M 11/046 248/125.2 |

(Continued)

*Primary Examiner* — Terrell L McKinnon
*Assistant Examiner* — Michael McDuffie
(74) *Attorney, Agent, or Firm* — Michael F. Krieger; Kirton McConkie

(57) ABSTRACT

A digital display mounting and lift bracket can be employed to mount a display device to a wall or other surface or within an enclosure. The bracket can be configured to pivot between an open and a closed position. When the bracket is in the open position, a display device will be lifted upwardly thereby facilitating access to the rear surface of the display device. The bracket can then be returned to the closed position in which the display device will be properly oriented for use.

20 Claims, 6 Drawing Sheets

(56) References Cited

U.S. PATENT DOCUMENTS

| | | | | |
|---|---|---|---|---|
| 8,684,325 B1* | 4/2014 | Beshara | ............ | F16M 13/02 |
| | | | | 248/274.1 |
| 9,016,647 B2* | 4/2015 | Lu | ............ | F16M 11/10 |
| | | | | 248/221.11 |
| 2003/0057340 A1* | 3/2003 | Mann | ............ | B60R 11/02 |
| | | | | 248/274.1 |
| 2003/0188672 A1* | 10/2003 | Parent | ............ | A47B 5/006 |
| | | | | 108/134 |
| 2004/0251388 A1* | 12/2004 | Williams | ............ | F16M 11/10 |
| | | | | 248/274.1 |
| 2006/0091274 A1* | 5/2006 | Asamarai | ............ | F16M 11/10 |
| | | | | 248/292.11 |
| 2008/0223996 A1* | 9/2008 | Joanisse | ............ | A47B 23/042 |
| | | | | 248/123.11 |
| 2015/0336495 A1* | 11/2015 | Maslakow | ............ | B60N 3/00 |
| | | | | 224/401 |
| 2016/0154295 A1* | 6/2016 | Chang | ............ | G06F 3/0421 |
| | | | | 248/274.1 |

* cited by examiner

DIGITAL DISPLAY MOUNTING AND LIFT BRACKET

CROSS-REFERENCE TO RELATED APPLICATIONS

N/A

BACKGROUND

Many businesses, such as restaurants, sporting venues, amusement parks, etc., employ digital display devices to convey information to their customers. These digital display devices (hereinafter "display devices"), which are similar to flat panel televisions, allow businesses to dynamically display and update content in a simple manner. These display devices are typically mounted directly to a wall or other structure, or may be mounted within an enclosure. In many cases, once a digital display is mounted, it can be difficult to access the rear surface of the digital display were many, if not all, of the digital display's ports/interfaces are located. It can therefore be difficult to modify a configuration of a digital display.

BRIEF SUMMARY

The present invention extends to a digital display mounting and lift bracket. The bracket of the present invention can be employed to mount a display device to a wall or other surface or within an enclosure. The bracket can be configured to pivot between an open and a closed position. When the bracket is in the open position, a display device will be lifted upwardly thereby facilitating access to the rear surface of the display device. The bracket can then be returned to the closed position in which the display device will be properly oriented for use.

In one embodiment, the present invention is implemented as a digital display mounting and lift bracket that includes: a bracket support; a mount member that includes a stationary member that is coupled to the bracket support and a pivoting member that is coupled to the stationary member via a hinged connection; and one or more shocks that extend between the bracket support and the pivoting member. The hinged connection allows the pivoting member to pivot between a closed position in which the pivoting member is adjacent to the stationary member and an open position in which the pivoting member is elevated away from the stationary member. The one or more shocks maintain the pivoting member in the open position.

In another embodiment, the present invention is implemented as a digital display mounting and lift bracket that includes a bracket support and a mount member. The mount member includes a stationary member and a pivoting member. The stationary member is formed of a vertical arm and a horizontal arm that extends outwardly from a top end of the vertical arm of the stationary member. The pivoting member is formed of a vertical arm and a horizontal arm that extends outwardly from a top end of the vertical arm of the pivoting member. The pivoting member is nested within the stationary member with the horizontal arm of the pivoting member being coupled to the horizontal arm of the stationary member via a hinge thereby allowing the pivoting member to pivot between a closed position in which the vertical arm of the pivoting member is adjacent to the vertical arm of the stationary member and an open position in which the vertical arm of the pivoting member is elevated from the vertical arm of the stationary member.

In another embodiment, the present invention is implemented as a digital display mounting and lift bracket that comprises a mount member that includes a stationary member and a pivoting member. The stationary member is formed of a vertical arm and a horizontal arm that extends outwardly from a top end of the vertical arm of the stationary member, while the pivoting member is formed of a vertical arm and a horizontal arm that extends outwardly from a top end of the vertical arm of the pivoting member. The pivoting member is nested within the stationary member with the horizontal arm of the pivoting member being coupled to the horizontal arm of the stationary member via a hinge thereby allowing the pivoting member to pivot between a closed position in which the vertical arm of the pivoting member is adjacent to the vertical arm of the stationary member and an open position in which the vertical arm of the pivoting member is elevated from the vertical arm of the stationary member.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification and the claims, the terms "vertical" and "horizontal" will be used to distinguish between different components of a digital display mounting and lift bracket and will refer to the general orientation of these components when the bracket is used in a typical configuration as depicted in the figures. However, the bracket of the present invention should not be limited to use in the depicted orientation, and therefore, these vertical and horizontal components could be used in orientations other than vertical or horizontal orientations respectively.

Figure 1A:
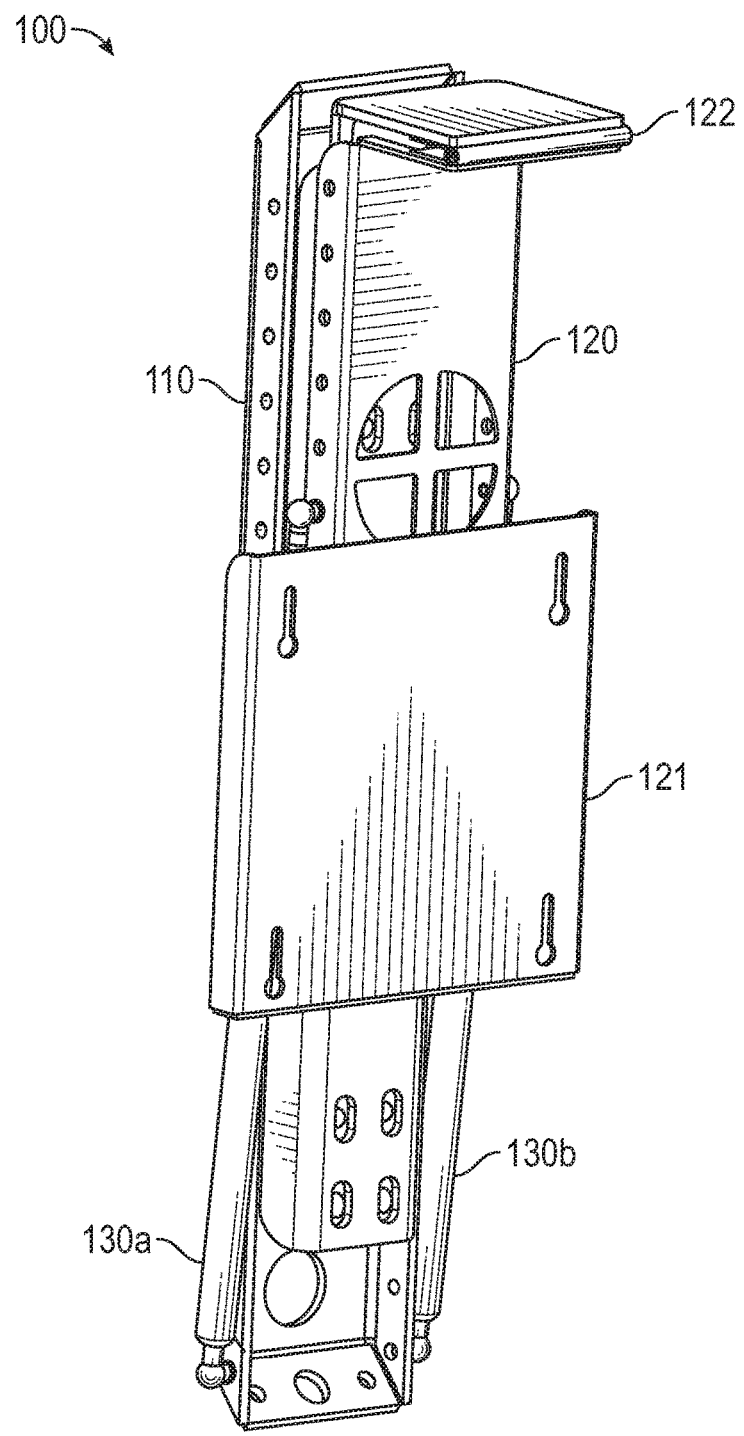
FIGS. 1A and 1B provide front perspective views of the bracket of the present invention in a closed and open position respectively.
Figure 1B:
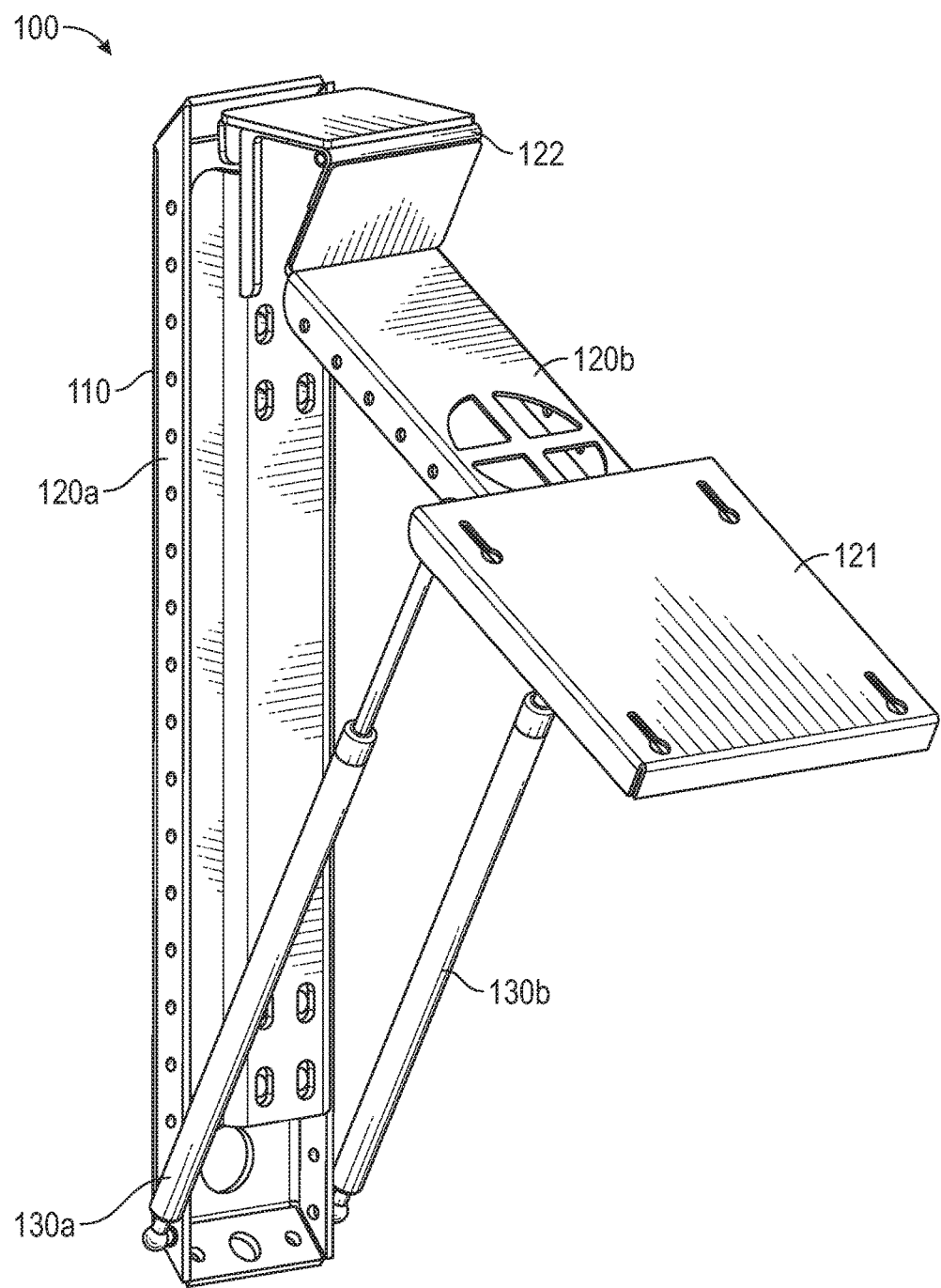
Figure 2A:
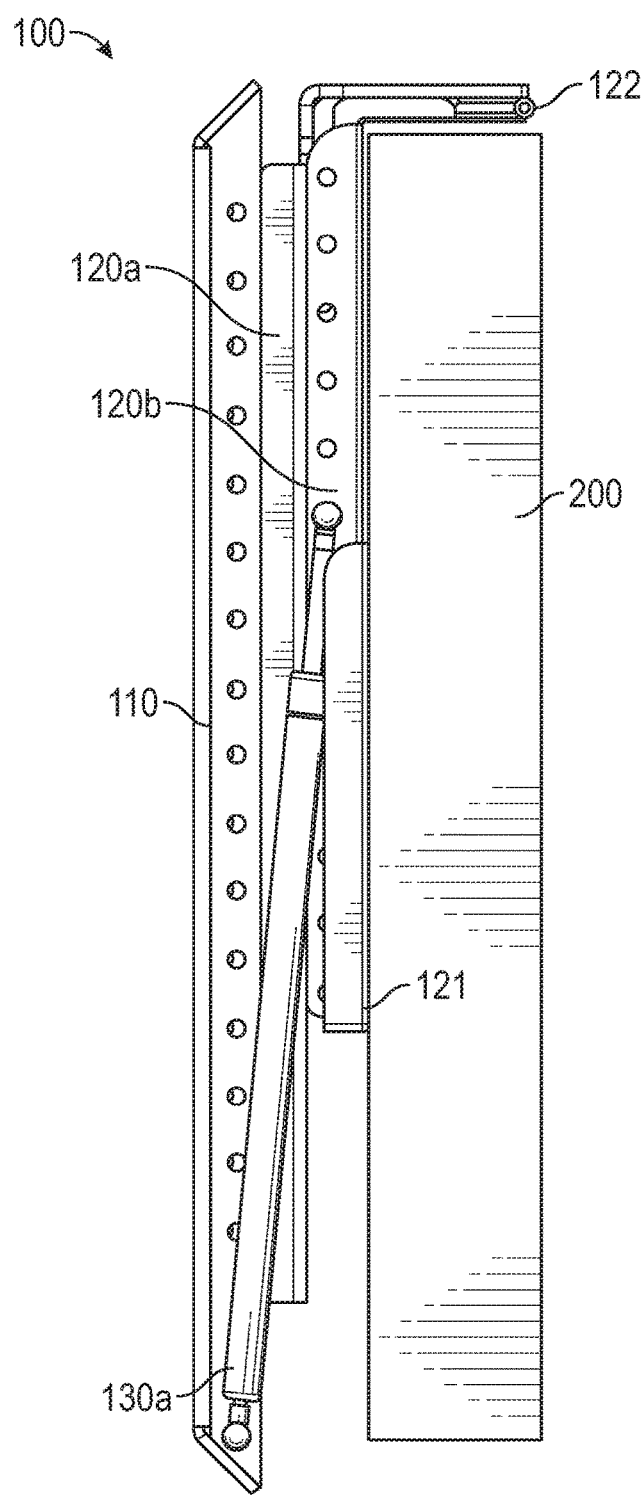
FIGS. 2A and 2B provide side views of the bracket of the present invention in a closed and open position respectively when a display device is mounted to the bracket.
Figure 2B:
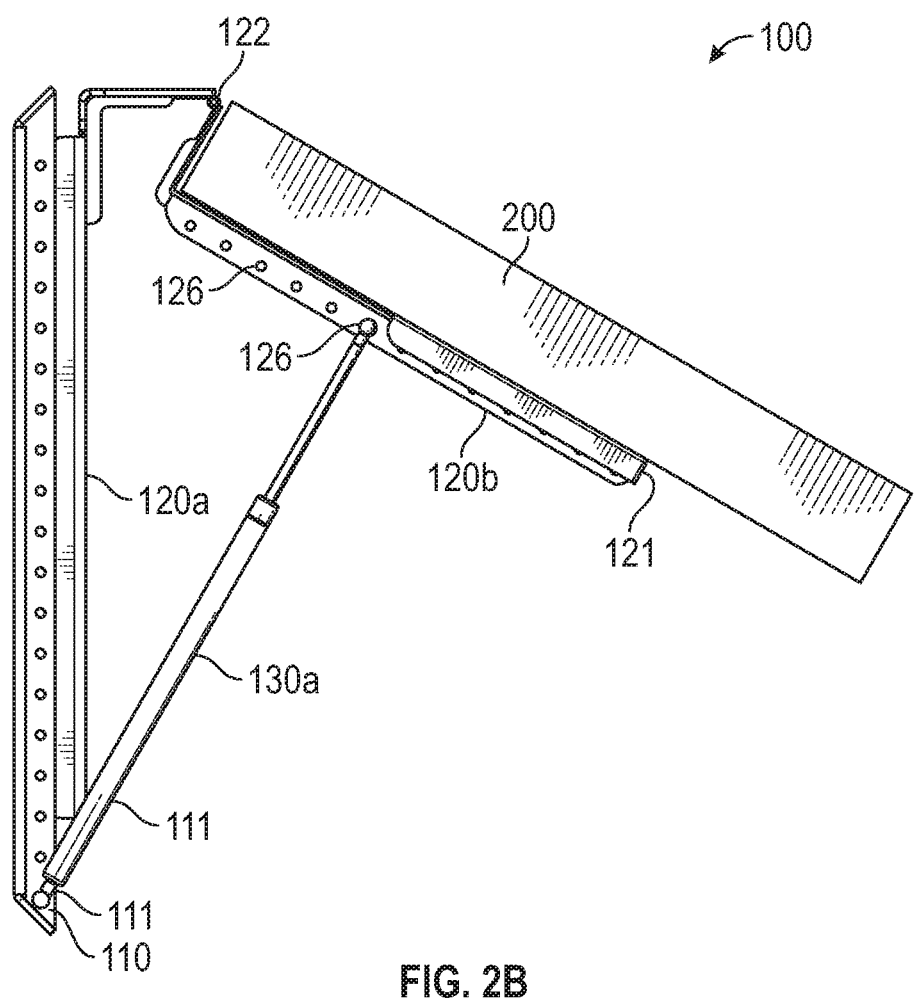
Figure 3A:
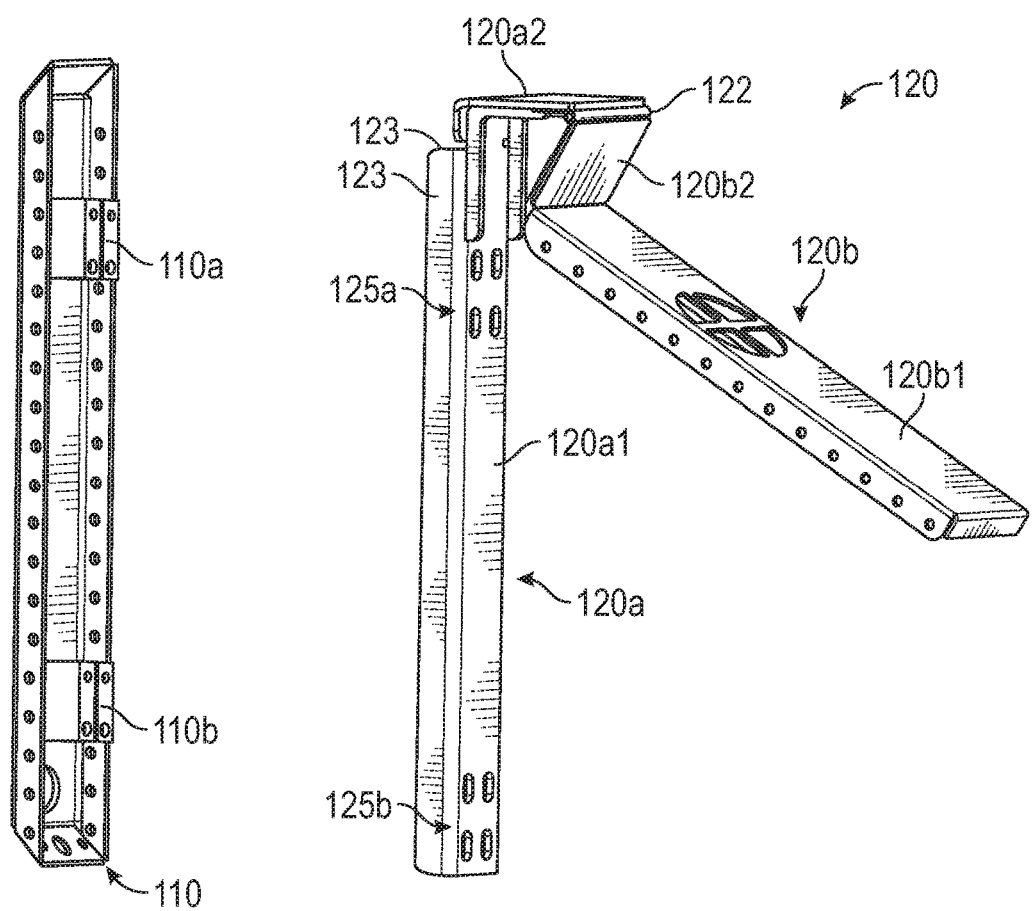
FIG. 3A illustrates front perspective views of a bracket support and a mount member of the bracket in isolation.
Figure 3B:
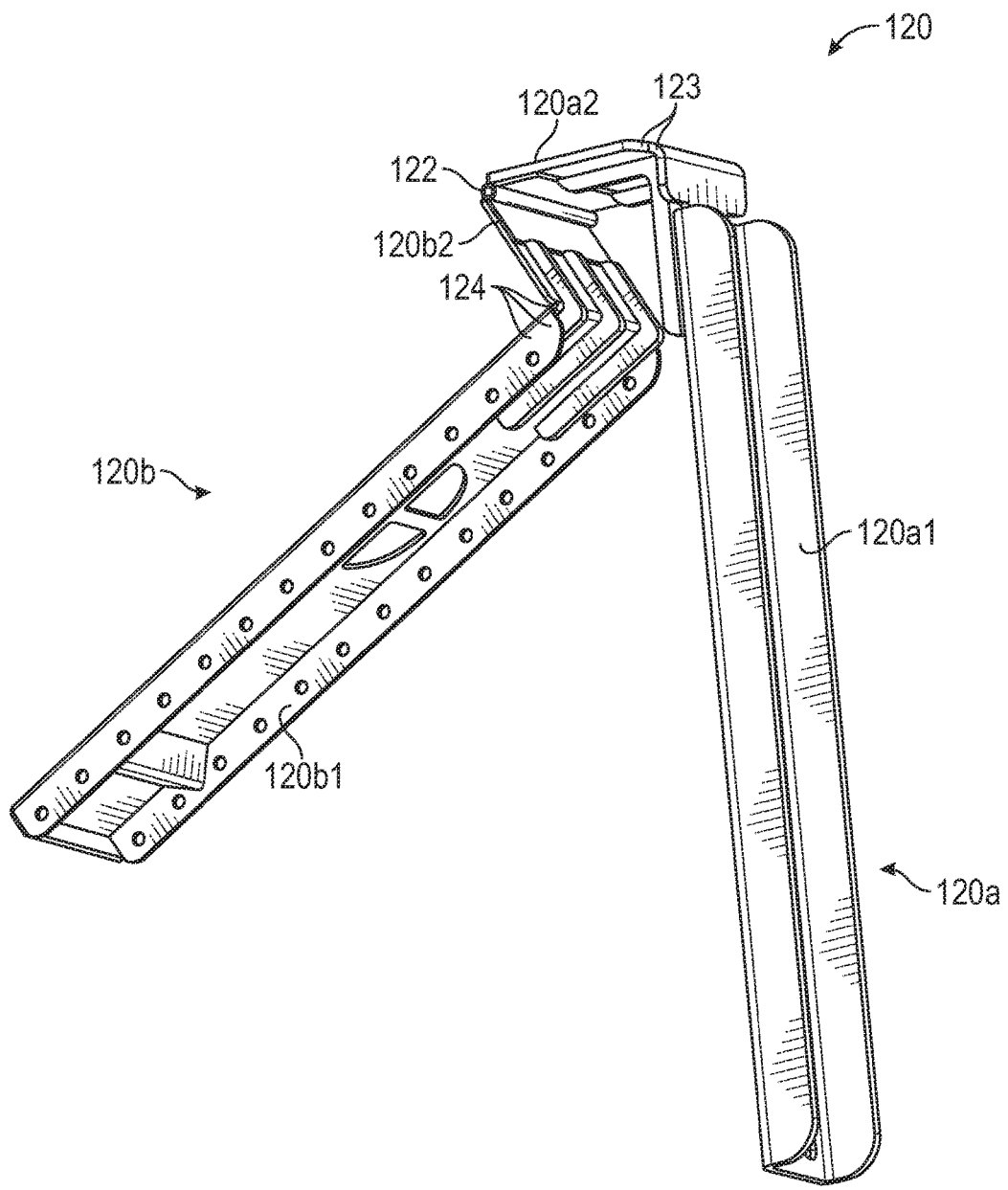
FIG. 3B illustrates a rear perspective view of the mount member in isolation.

FIGS. 1A and 1B provide views of a digital display mounting and lift bracket 100 when a display device is not mounted to the bracket. In contrast, FIGS. 2A and 2B provide views of bracket 100 when a display device 200 is mounted to the bracket. In FIGS. 3A and 3B, components of bracket 100 are shown in isolation. In this specification and the claims, a display device should be construed as encompassing flat screen televisions, monitors, or other digital displays that can be used to display any type of content in any setting. As a non-limiting example, bracket 100 could be employed in a restaurant to mount a display device for the purpose of displaying a menu. In some embodiments, bracket 100 could be secured directly to the wall or within an enclosure. An example of a suitable enclosure within which bracket 100 may be employed is disclosed in U.S. patent application Ser. No. 14/715,265, although bracket 100 could be employed in any other type of enclosure that would enable the display device to pivot as will be further described below.

Referring to FIGS. 1A-3B, bracket 100 can generally comprise a bracket support 110, a mount member 120, and one or more shocks 130a, 130b that are each connected between bracket support 110 and mount member 120. As is best shown in FIG. 3A, bracket support 110 comprises an elongated piece of material (e.g., steel) that can be configured to be secured to a wall or other structure or to an enclosure. For example, each end of bracket support 110 could include one or more holes through which bolts/screws could extend to couple bracket support 110 to the wall, other structure, or enclosure.

As is also best shown in FIG. 3A, mount member 120 is a separate component from bracket support 110 but can be configured to be secured to bracket support 110. For example, bracket support 110 can include mounting structures 110a, 110b which can include a number of threaded holes for receiving bolts that pass through corresponding holes 125a, 125b formed in mount member 120 to thereby secure mount member 120 to bracket support 110. Accordingly, in typical use cases, bracket support 110 can first be secured to the wall or other structure, and then mount member 120 can be secured to bracket support 110.

As identified in FIGS. 3A and 3B, mount member 120 can be formed of two main components: a stationary member 120a and a pivoting member 120b. Stationary member 120a includes a vertical arm 120a1 and a horizontal arm 120a2 which extends from a top end of vertical arm 120a1. In some embodiments, horizontal arm 120a2 may extend from vertical arm 120a1 at a substantially 90 degree angle. Vertical arm 120a1 can function as the portion of mount member 120 that is secured to bracket support 110 as described above (e.g., vertical arm 120a1 can include holes 125a, 125b).

Pivoting member 120b can have the same general shape as stationary member 120a. In particular, pivoting member 120b can also be formed by a vertical arm 120b1 and a horizontal arm 120b2 that extends from one end of vertical arm 120b1. A terminal end of each of horizontal arms 120a2 and 120b2 can be coupled together via a hinge 122. A length of horizontal arm 120b2 can be less than a length of horizontal arm 120a2 such that pivoting member 120b can be pivoted between an open position in which vertical arm 120b1 is separated from vertical arm 120a1 and a closed position in which vertical arm 120b1 is positioned alongside vertical arm 120a1. In other words, pivoting member 120b can be sized and shaped to be nested "within" stationary member 120a.

In some embodiments, stationary member 120a can include one or more fillets 123 (two of which are shown in FIGS. 3A and 3B) between vertical arm 120a1 and horizontal arm 120a2 to thereby reinforce the interface between these two arms. Similarly, pivoting member 120b can include one or more fillets 124 (three of which are shown in FIG. 3B) between vertical arm 120b1 and horizontal arm 120b2 to thereby reinforce the interface between these two arms. Fillets 123 can be offset with respect to fillets 124 so that they do not contact each other when pivoting member 120b is in the closed position. The length of horizontal arm 120b2 can be configured to ensure that fillets 123, 124 will not prevent pivoting member 120b from fully closing. In some embodiments, both vertical arms 120a1 and 120b1 may include additional reinforcing structures such as the bent side edges shown in the figures.

As best shown in FIGS. 1A and 1B, a mount plate 121 may be secured to (or integrated into) vertical arm 120b1. Mount plate 121 can be sized and shaped to allow holes to be formed therein that will correspond to the mounting holes of a typical display device. For example, many flat screen televisions employ a standard pattern for mounting holes, and mount plate 121 may be configured to include corresponding holes to enable such televisions to be secured to mount plate 121. In some embodiments, mount plate 121 may be removably secured to vertical arm 120b1 such that an appropriately configured mount plate can be selected for use based on the type of display device that will be mounted using bracket 100.

Shocks 130a, 130b may be coupled between bracket support 110 and vertical arm 120b1 and can function to retain pivoting member 120b in the open position such as is shown in FIGS. 1B and 2B. As is shown in the figures, shocks 130a, 130b may be coupled at a bottom of bracket support 110 via a pivoting connection that will allow shocks 130a, 130b to pivot as pivoting member 120b is raised into the open position. A length of bracket support 110 may be sufficient to cause the other end of shocks 130a, 130b to be coupled towards a middle of vertical arm 120b1 to thereby minimize the force on shocks 130a, 130b when pivoting member 120b is in the open position. In some embodiments, the folded edges of vertical arm 120b1 as well as folded edges of bracket support 110 can include a number of holes 111, 126 to which shocks 130a, 130b can be coupled. In this way, the configuration of shocks 130a, 130b can be adjusted based on the size and/or weight of the display device.

With reference to FIG. 2A, a length or depth of horizontal arm 120b2 (and therefore a length or depth of horizontal arm 120a2) can be configured to correspond with a typical depth of a display device 200. In this way, the ends of horizontal arms 120a2, 120b2 (and hinge 122) will be positioned substantially in alignment with the front surface of the display device to thereby minimize any possible interference that these components may cause when display device 200 is pivoted upwardly to the open position.

As shown in FIGS. 2A and 2B, a display device 200 that is mounted to bracket 100 can be pivoted between a closed position (e.g., a vertical position) and an open position in which a rear surface of display device 200 can be more easily accessed. Shocks 130a, 130b can retain display device 200 in this open position so that it will not be necessary to manually hold the display device while connecting cables or otherwise accessing the rear surface of the display device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A digital display mounting and lift bracket comprising:
   a bracket support;
   a mount member that includes a stationary member that is coupled to the bracket support comprising a vertical arm and a horizontal arm that extends outwardly from an end of the vertical arm and a pivoting member comprising a vertical arm and a horizontal arm that extends outwardly from an end of the vertical arm of the pivoting member, the pivoting member being coupled to the stationary member via a hinged connection, the hinged connection allowing the pivoting member to pivot between a closed position in which the pivoting member is adjacent to the stationary member and an open position in which the pivoting member is elevated away from the stationary member; and
   one or more shocks that extend between the bracket support and the pivoting member, the one or more shocks retaining the pivoting member in the open position.

2. The bracket of claim 1, wherein the vertical arm of the stationary member is removably coupled to the bracket support.

3. The bracket of claim 1, wherein the horizontal arm of the stationary member is coupled to the horizontal arm of the pivoting member via a hinge to form the hinged connection.

4. The bracket of claim 3, wherein the pivoting member is nested within the stationary member when the pivoting member is in the closed position.

5. The bracket of claim 3, wherein the stationary member includes one or more fillets that extend between the vertical arm and the horizontal arm of the stationary member.

6. The bracket of claim 3, wherein the pivoting member includes one or more fillets that extend between the vertical arm and the horizontal arm of the pivoting member.

7. The bracket of claim 3, wherein sides edges of the vertical arm of the pivoting member are bent towards the stationary member.

8. The bracket of claim 7, wherein the one or more shocks are each coupled to one of the bent side edges of the vertical arm of the pivoting member.

9. The bracket of claim 1, wherein the mount member comprises a plurality of mounting holes in the stationary member adapted to permit passage of a plurality of bolts to secure the mount member to the bracket support.

10. The bracket of claim 1, wherein the bracket support includes one or more mounting structures to which the mount member couples to secure the mount member to the bracket support.

11. The bracket of claim 1, wherein the bracket support is configured to be coupled to a wall or an enclosure.

12. A digital display mounting and lift bracket comprising:
   a bracket support; and
   a mount member that includes a stationary member and a pivoting member, the stationary member being formed of a vertical arm and a horizontal arm that extends outwardly from a top end of the vertical arm of the stationary member, the pivoting member being formed of a vertical arm and a horizontal arm that extends outwardly from a top end of the vertical arm of the pivoting member, the pivoting member being nested within the stationary member with the horizontal arm of the pivoting member being coupled to the horizontal arm of the stationary member via a hinge thereby allowing the pivoting member to pivot between a closed position in which the vertical arm of the pivoting member is adjacent to the vertical arm of the stationary member and an open position in which the vertical arm of the pivoting member is elevated from the vertical arm of the stationary member.

13. The bracket of claim 12, further comprising:
   one or more shocks that are configured to maintain the pivoting member in the open position.

14. The bracket of claim 13, wherein the one or more shocks are each coupled between the bracket support and the vertical arm of the pivoting member.

15. The bracket of claim 12, wherein the vertical arm of the pivoting member includes a mount plate for mounting a display device to the bracket.

16. The bracket of claim 12, further comprising:
   one or more fillets that extend between the vertical and horizontal arms of the stationary member; and
   one or more fillets that extend between the vertical and horizontal arms of the pivoting member.

17. The bracket of claim 12, wherein the vertical arms of the stationary and pivoting members include side edges that are bent towards the bracket support.

18. The bracket of claim 17, wherein each of the one or more shocks is coupled to one of the bent side edges of the vertical arm of the pivoting member.

19. A digital display mounting and lift bracket comprising:
   a mount member that includes a stationary member and a pivoting member, the stationary member being formed of a vertical arm and a horizontal arm that extends outwardly from a top end of the vertical arm of the stationary member, the pivoting member being formed of a vertical arm and a horizontal arm that extends outwardly from a top end of the vertical arm of the pivoting member, the pivoting member being nested within the stationary member with the horizontal arm of the pivoting member being coupled to the horizontal arm of the stationary member via a hinge thereby allowing the pivoting member to pivot between a closed position in which the vertical arm of the pivoting member is adjacent to the vertical arm of the stationary member and an open position in which the vertical arm of the pivoting member is elevated from the vertical arm of the stationary member.

20. The bracket of claim 19, further comprising:
   a bracket support to which the vertical arm of the stationary member couples; and
   one or more shocks that are coupled to the vertical arm of the pivoting member, the one or more shocks configured to maintain the pivoting member in the open position.

* * * * *